Jan. 5, 1971 W. J. HOPKINS 3,553,671
INDICATING MEANS
Filed Feb. 20, 1968 2 Sheets-Sheet 1
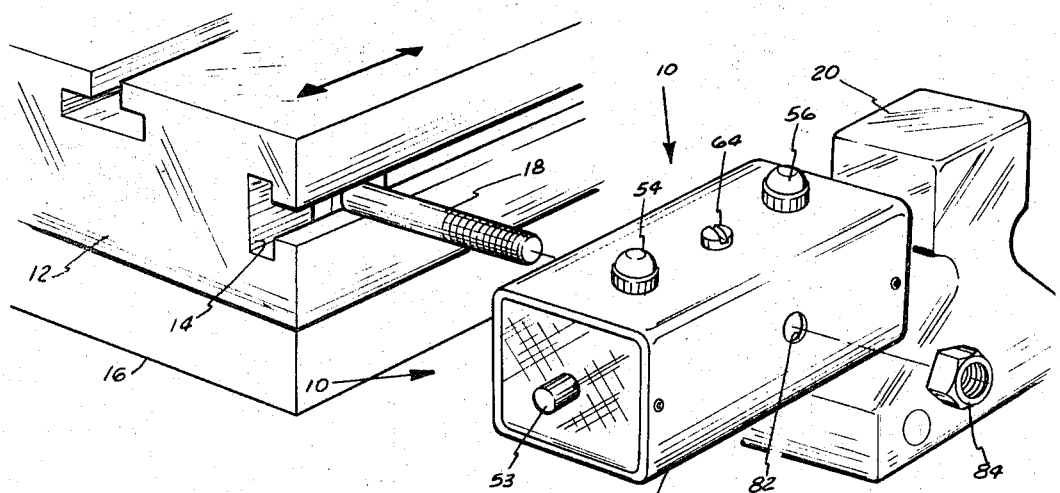
FIG-1
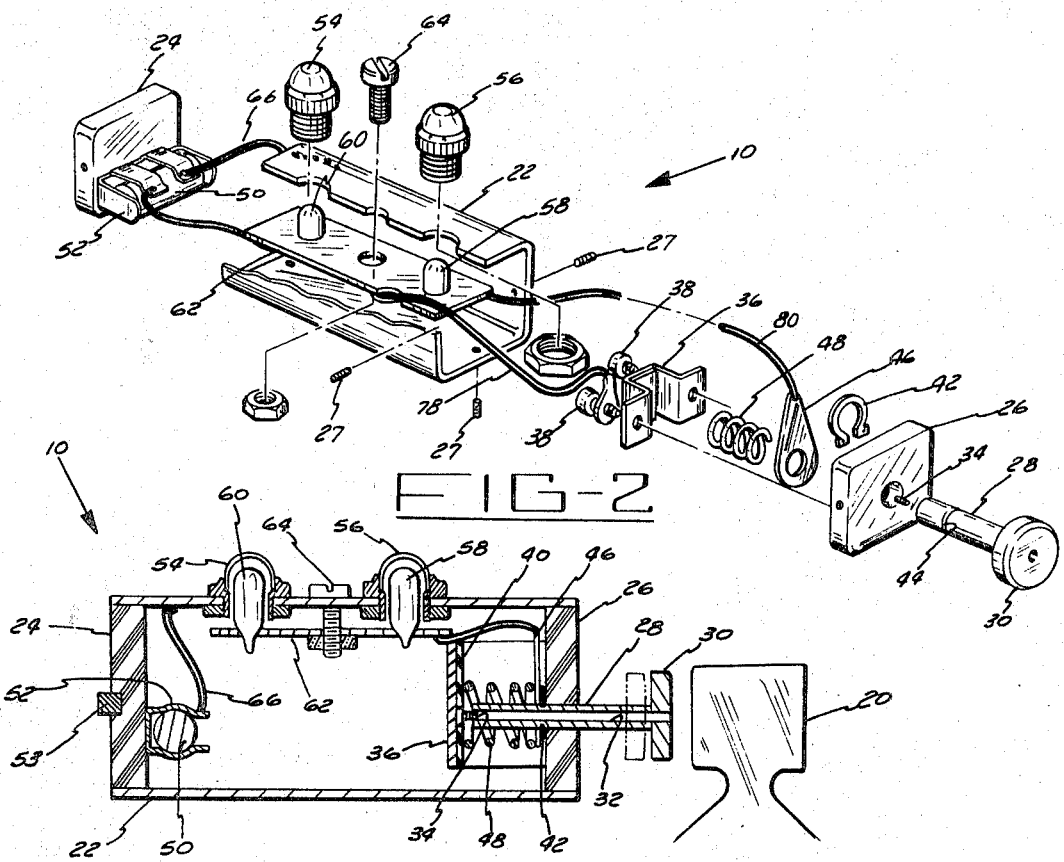
FIG-2
FIG-3
INVENTOR.
WILLIAM J. HOPKINS
BY
Hauke, Krass, Gifford & Patalidis
ATTORNEYS United States Patent Office 3,553,671
Patented Jan. 5, 1971

3,553,671
INDICATING MEANS
William J. Hopkins, Detroit, Mich., assignor, by mesne assignments, to Randcar Corporation
Filed Feb. 20, 1968, Ser. No. 706,984
Int. Cl. G08b 23/00
U. S. Cl. 340—267                        13 Claims

ABSTRACT OF THE DISCLOSURE

A battery operated device having a pair of indicating lamps and adapted for mounting on a machine to indicate the movement of a movable machine member past a pair of reference points.

In a metal cutting machine, one point could correspond with the termination of the rough feed of the cutting tool, the second point with the termination of the finish feed.

BACKGROUND OF THE INVENTION

This invention relates to a device for sensing and visually indicating the relative position between a pair of machine members as one of the machine members moves relative to the second machine member between predetermined positions.

Cutting machines may generally be classified into the type where the workpiece is held in one position and the cutting tool is moved relative to the workpiece for the removal of metal, or the cutting tool is held stationary and the workpiece moves into engagement with the cutting tool. In either case it is necessary that the motion between the movable and the fixed machine members be terminated by the operator within closely held tolerances. One method of achieving this result is for the operator to cut a portion of the workpiece which is then gauged and then removed more metal from the workpiece until it assumes a finished shape. This method, however, does not accommodate a repetitive, high speed operation. In addition, the operator often may perform a rough cut to reduce the workpiece to a semi-finished condition and then change the cutting tool for a finish cut so that he is concerned with two dimensions.

The broad purpose of the present invention is to provide a device that can be mounted on most cutting machines such as lathes, gear-cutters, milling machines and the like and which will visually indicate to the operator the relative position between the cutting tool and and the workpiece in two different predetermined reference positions.

SUMMARY

The preferred embodiment of the present invention comprises a device that can be easily mounted in any of a variety of positions by a single mounting bolt with no effect on its accuracy. The preferred device is formed from a metallic tubular housing with each end plugged by an end piece of a non-conducting material. A reciprocally mounted metal rods is mounted in one of the end pieces for motion between an extended and retracted position. When the housing is mounted on a movable machine table, a sensing head on the end of the rod is positioned to contact a permanent stop member of the machine.

The housing, the metal machine members and the sensing head all form part of an electrical circuit connected to a battery internally mounted in the housing. A pair of indicating lamps are also mounted on the housing. The internal circuitry of the housing includes a printed circuit board and leads which connect one pole of the battery to the housing and the second pole of the battery to the two indicating lamps.

The lamps are connected parallel in such a manner that when the work table moves the housing and the sensing head to a position where the sensing head contacts the fixed machine stop one of the lamps is energized to indicate to the operator that the work table has moved the workpiece a sufficient distance to complete a rough cut. Further motion of the work table causes the fixed machine member to retract the rod until its inner end closes a second circuit and energizes the second indicating lamp to indicate to the operator that the work table has advanced a sufficient distance to complete the finish cut. The operator can return the work table to its initial position to open the two circuits for the start of the next cutting cycle.

The position of the housing can be easily adjusted on the work table to vary the rough cutting dimension and an adjustable member on the sensing rod provides means for varying the distance between the rough and finished dimensions. By providing a visual indication to the operator of the relative positions between the work table and the cutting tool, time consuming gauging and observation of the micrometer index is eliminated. The device employs a battery as a source of electricity so that it can be easily mounted on different machines without any external wiring. Reliability is further enhanced by employing a printed circuit assembly which provides years of reliable use and easy replacement.

Other advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views and in which:

FIG. 1 is a perspective view showing the preferred indicating device separated from a machine having a movable work table;

FIG. 2 is an exploded view of the preferred indicating device;

FIG. 3 is a longitudinal sectional view through the preferred indicating device.

DESCRIPTION OF THE PREFERRED EMBODIMENT

Figure 4:
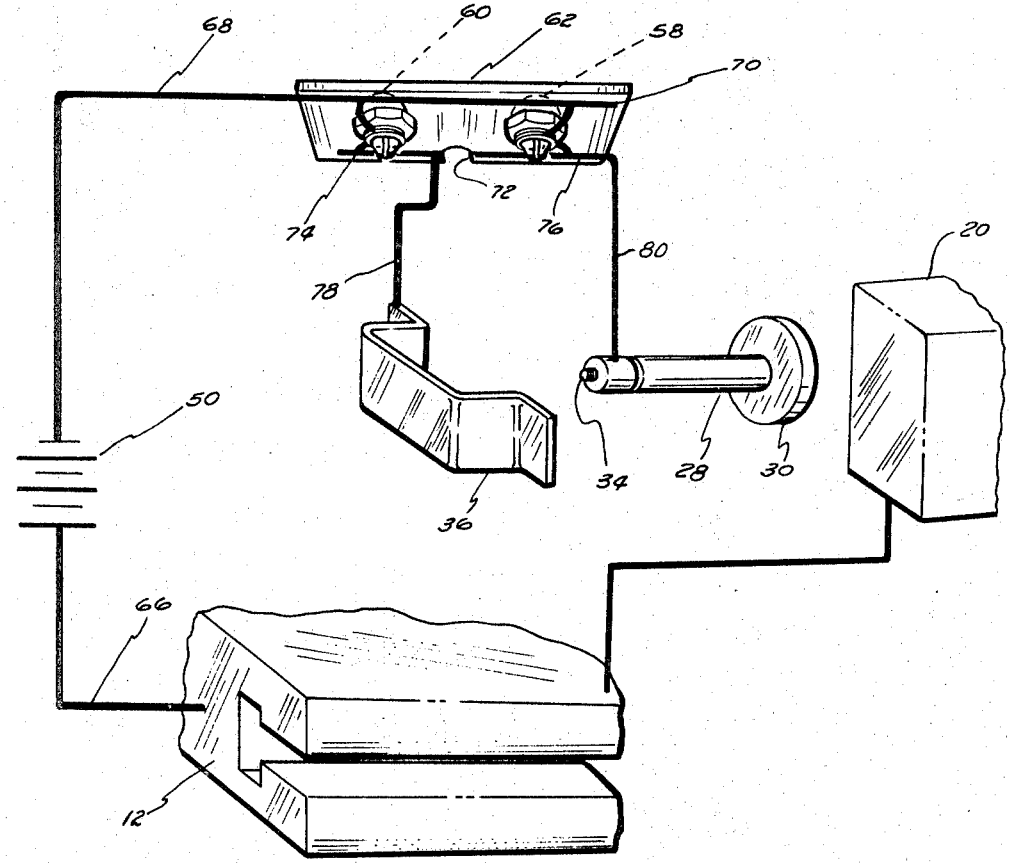
FIG. 4 is a schematic illustration of the electrical circuit of the preferred device.

Now referring to the drawings, FIG. 1 illustrates a preferred indicating device 10 adapted for mounting on a slidably mounted work table 12 having a T-slot 14. The work table 12 supports a work piece (not shown) and moves the workpiece into cutting engagement with a cutting tool (not shown) which is fixedly mounted on a machine base 16. The indicating device 10 is mounted by a T-bolt 18 to the work table so that as the table reciprocates in its cutting cycle, it moves the indicating device 10 toward and away from a stop member 20 which is fixedly mounted on the base 16. The work table 12 and the fixed stop member 20 as well as the base 16 are all formed of metal or other electrically conductive material.

Referring to FIGS. 2 and 3, the indicating device 10 comprises a steel tubular housing 22 having a square cross section. An end member 24 and an end member 26 close the opposite ends of the housing 22 and are preferably attached to the housing by threaded fasteners 27.

The end members 24 and 26 are formed of a suitable non-conductive material such as a plastic. An elongated metal rod 28 is reciprocally mounted in the end member 26 and has an enlarged sensing head 30 on its outer end. The rod 28 and the head 30 are integrally joined together and have a longitudinal bore 32 extending from their outer end to their inner end. A metal set screw 34 is threadably mounted at the inner end of the bore 32 with the bore 32 providing access so the operator can insert an Allen wrench into the bore to adjust the position of the set screw 34 and vary the overall length of the rod.

A metal channel-shaped bracket 36 is mounted on the inner side of the end piece 26 by a pair of threaded fasteners 38. The midsection of the channel-shaped member 36 is spaced from the end piece 20 and carries a pad 40 of insulation material on its inner side. A metal snap ring 42 is mounted in a groove 44 in the midsection of the rod 28. An electrical clip 46 is also mounted on the rod adjacent the snap ring 42. A spring 48 acts between the pad 40 and the clip 46 to bias the rod 28 toward an extended position. The fully extended position is defined by the snap ring 42 engaging the inner surface of the end piece 26. The pad 40 is apertured adjacent the adjusting screw 34 so that when the rod is fully retracted the screw 34 makes a metal-to-metal contact with the bracket 36. Thus the screw 34 provides means for adjusting the stroke of the rod 28 between its fully retracted and fully extended positions. It is to be noted that the rod 28, the spring 48, the clip 46, and the snap ring 42 are electrically isolated from the housing 22 and the channel-shaped bracket 26 when the rod 28 is not fully retracted.

An electrical storage battery 50 is mounted by a bracket 52 on the inner side of the end member 24 and a metal tab 53 extends from its outer side. A pair of bulb assemblies 54 and 56 are mounted on one wall of the housing 22. Preferably the bulb assembly 56 provides an amber illumination when an internally mounted lamp 58 is energized and the bulb assembly 54 provides a red illumination when an internally mounted lamp 60 is energized. The lamps 58 and 60 are mounted within the housing by a rectangular printed circuit board 62 which is fastened to the housing by a plastic nut and bolt assembly 64.

Referring to FIG. 4 for a description of the preferred electrical circuitry, one pole of the battery 50 is connected by a lead 66 to the housing 22 which provides an electrical connection with the work table 12. The other pole of the battery 50 is connected by a lead 68 to an electrical conducting strip 70 extending the length of the circuit board 62. A second electrically conducting strip is divided by a notch 72 to form a pair of short strips 74 and 76. The lamp 60 is connected to the strips 70 and 74 and the lamp 58 is connected to the strips 70 and 76 so that they are in electrically parallel relationship. A lead 78 connects the strip 74 to the bracket 36 and a lead 80 connects the strip 76 on the rod 28. Because the work table 12 is in metal-to-metal contact with the fixed stop member 20 it can be seen that a contact established between the stop member 20 and the sensing head 30 closes the circuit to the lamp 58. When the lamp 58 is energized contact established between the screw member 34 and the bracket 36 energizes the second lamp 60.

The preferred indicating device can be employed in most production machinery set-ups either in horizontal or vertical positions and in any repetitive cutting operation. The set-up on a typical machine is as follows: The housing 22 is mounted to the work table 12 by the T-bolt 18 which is inserted through a pair of openings 82 in the housing, engaged with a nut 84 and hand tightened until proper alignment is made. If for example the operator is milling on a milling machine, with the work piece in position, the work table 12 is moved to a point where he desires to rough mill. The device 10 is slid into position until the sensing head 30 contacts the stop 20 of the machine. At this exact point, the lamp 58 will commence to glow with an amber illumination. This then becomes the rough "stop" and the indicating device will accurately and repetitively signal this stop position. Assuming that the operator wants to leave .010 inch of metal for finishing which can be checked with the vernier setting of the machine (not shown), the operator variably adjusts the adjusting screw 34 through the bore 32 of the sensing rod 28 with an Allen wrench. The operator can now rough mill the work piece until the amber light 58 glows and then finish the mill until the red lamp 60 glows. The device can be easily mounted, easily adjusted, requires a relatively few long lived components and requires only that the battery 50 be periodically replaced.

Although I have described but one embodiment of my invention, it is to be understood that various changes and revisions can be made therein without departing from the spirit of the invention as expressed in the scope of the appended claims.

Having thus described my invention, I claim:

1. In a machine having a pair of machine members including a relatively fixed machine member and a relatively movable machine member, indicating means for indicating the presence of the movable machine member in a pair of reference positions in its path of motion, said indicating means, comprising:

a sensing means of electrically conductive material;

means for movably mounting said sensing means on a first of said machine members in spaced relationship with respect to the second of said machine members when the movable machine member is in an initial position spaced from said reference positions, said sensing means being disposed in the path of relative movement between said pair of machine members so as to engage the second of said machine members when the movable machine member is in the first reference position, said mounting means being arranged so that said sensing means is engaged with the second of said machine members as the movable machine member advances from the first reference position to the second reference position;

a contact;

means mounting said contact in the path of movement of said sensing means so as to engage said sensing means when the movable machine member is in the second reference position;

a pair of electrically responsive indicators;

first electrical circuit means for energizing a first of said pair of indicators in response to engagement of said sensing means and the second of said machine members, said first electrical circuit means including an electrical circuit through said sensing means and the second of said machine members; and second electrical circuit means for energizing the second of said pair of indicators in response to engagement of said sensing means and said contact when the movable machine member is in the second reference position.

2. The invention as defined in claim 1, wherein said sensing means forms a current conducting portion of said second electrical circuit means.

3. The invention as defined in claim 1, wherein the means for mounting said sensing means includes a support member, means for movably mounting said sensing means on said support member, and means for adjustably attaching said support member on the first of said machine members so that said sensing means is spaced a predetermined distance from the second of said machine members when the movable machine member is in its initial position.

4. The invention as defined in claim 1, wherein said sensing means is elongated and supported for movement in the direction of its length and one end of said sensing means is engageable with the second of said machine members and its opposite end is engageable with said contact.

5. The invention as defined in claim 4, including means for adjusting the length of said sensing means so as to vary the distance between said first and second reference positions.

6. The invention as defined in claim 4, wherein said sensing means comprises an elongated first member having one end engageable with the second of said machine members and a bore extending from said one end to its opposite end and a second member mounted on said first member for movement between positions varying the effective length of said first member, said second member being engageable with said contact and having portions in said bore adapted for engagement with tool means inserted through said bore for moving said second member to a selected position.

7. An indicating device for indicating the presence of the first of a pair of relatively movable machine members in a predetermined position relative to the second of said pair of machine members, comprising:
   support means adapted for mounting on the first of said pair of machine members;
   an abutment of electrically conductive material on said support means;
   a sensing member having first and second ends and a bore extending through said sensing member from one end to the other thereof;
   an adjustable element of electrically conductive material mounted in the bore of said sensing member adjacent said second end and adapted for engaging tool means inserted through said bore from said first end so as to vary the positions of said adjustable element relative to the first end of said sensing member;
   means for mounting said sensing member on said support means for motion in the direction of relative movement of said machine members between a first position wherein said adjustable element is spaced from said abutment and the first end of said sensing means is disposed in the path of relative movement of the pair of machine members so as to engage the second of said pair of machine members, and a second position wherein said adjustable element engages said abutment, and
   indicating means responsive to the engagement between said adjustable element and said abutment, said indicating means including an electrically responsive indicator and electrical current means including means for establishing electrical current through said adjustment element and said abutment when said adjustable element is engaged with said abutment.

8. An indicating device as defined in claim 7, including bias means for urging said sensing member in the direction away from said abutment.

9. An indicating device as defined in claim 8, wherein said sensing member is elongated and supported for motion in the direction of its length, and wherein the adjustable element provides means for varying the effective length of said sensing member so as to vary the motion of said sensing member between said first and second positions to a predetermined distance.

10. An indicating device as defined in claim 7, wherein said support means comprises a housing adapted for mounting on the first of said pair of machine members, said abutment is disposed in said housing, said sensing member is elongated and mounted for longitudinal movement on said housing in directions toward and away from said abutment with said second end disposed in said housing and normally spaced from said abutment and said first end extending out of said housing and adapted for engagement with the second machine member.

11. An indicating device as defined in claim 10, wherein said housing is of electrically conductive material and adapted to form a part of an electrical circuit established by engagement between said adjustable element and said abutment for energizing said indicator means.

12. In a machine having a pair of machine members formed of electrically conductive material and including a relatively fixed machine member and a relatively movable machine member, indicating means for indicating the presence of the movable machine member in a pair of reference positions in its path of motion, said indicating means, comprising:
   a sensing means of electrically conductive material;
   means for movably mounting said sensing means on a first of said machine members in spaced relationship with respect to the second of said machine members when the movable machine member is in an initial position spaced from said reference positions, said sensing means being disposed in the path of relative movement between said pair of machine members so as to engage the second of said machine members when the movable machine member is in the first reference position, said mounting means being arranged so that said sensing means is engaged with the second of said machine members as the movable machine member advances from the first reference position to the second reference position, said mounting means normally electrically insulates said sensing means with respect to said first machine member;
   a contact;
   means mounting said contact in the path of movement of said sensing means so as to engage said sensing means when the movable machine member is in the second reference position;
   a pair of electrically responsive indicators;
   first electrical circuit means for energizing a first of said pair of indicators in response to engagement of said sensing means and the second of said machine members, said first electrical circuit means including an electrical storage battery, means providing an electrical connection between one pole of said battery and said pair of machine members, and means electrically connecting the first of said indicators and said sensing means in series with the second pole of said battery so that said sensing means and the second of said machine members form a first switch means for energizing the first of said indicators; and
   second electrical circuit means for energizing the second of said pair of indicators in response to engagement of said sensing means and said contact when the movable machine member is in the second reference position, said second electrical circuit means including means electrically connecting the second of said indicators and said contact in series with the second pole of said battery so that said sensing means and said contact form a second switch means for the second of said indicators when said first switch means is closed.

13. An indicating means for use with a machine having a pair of machine members including a relatively fixed machine member and a relatively movable machine member, said indicating means indicating the presence of the movable machine member in a pair of reference positions in its path of motion and comprising:
   a sensing means of electrically conductive material;
   means for movably mounting said sensing means on a first of said machine members in spaced relationship with respect to the second of said machine members when the movable machine member is in an initial position spaced from said reference positions, said mounting means adapted to mount said sensing means in the path of relative movement between said pair of machine members so as to engage the second of said machine members when the movable machine member is in the first reference position, said mounting means being arranged so that said sensing means is engaged with the second of said machine members as the movable machine member advances from the first reference position to the second reference position;
a contact;
means mounting said contact in the path of movement of said sensing means so as to engage said sensing means when the movable machine member is in the second reference position;
a pair of electrically responsive indicators;
first electrical circuit means for energizing a first of said pair of indicators in response to engagement of said sensing means and the second of said machine members, said first electrical circuit means including an electrical circuit through said sensing means and the second of said machine members; and
second electrical circuit means for energizing the second of said pair of indicators in response to engagement of said sensing means and said contact when the movable machine member is in the second reference position.

References Cited

UNITED STATES PATENTS

| | | | |
|---|---|---|---|
| 2,433,585 | 12/1947 | Warner | 33—147X |
| 2,508,051 | 5/1950 | Warren et al. | 340—265UX |
| 2,783,460 | 2/1957 | Pistoles | 340—265 |
| 2,876,443 | 3/1959 | Honeyman | 340—267X |
| 3,129,417 | 4/1964 | Gruber et al. | 340—267X |
| 3,270,329 | 8/1966 | Schnell | 340—282UX |
| 3,350,617 | 10/1967 | Firth | 340—267X |

THOMAS B. HABECKER, Primary Examiner

D. L. TRAFTON, Assistant Examiner

U.S. Cl. X.R.

33—143; 340—265, 282

PO-1050
(5/69)

UNITED STATES PATENT OFFICE
CERTIFICATE OF CORRECTION

Patent No. __3,553,671__    Dated __January 5, 1971__

Inventor(s) __WILLIAM J. HOPKINS__

It is certified that error appears in the above-identified patent and that said Letters Patent are hereby corrected as shown below:

IN THE SPECIFICATION

Column 1, line 13, after "machine" insert

-- for instance -- after "one" insert -- reference line 17, after "second" insert

-- reference -- line 58, change "rods" to -- rod --

Column 3, line 15, change "20" to -- 26 --

Signed and sealed this 4th day of May 1971.

(SEAL)
Attest:

EDWARD M. FLETCHER, JR.
Attesting Officer

WILLIAM E. SCHUYLER, J1
Commissioner of Patent: